Patented Aug. 21, 1923.

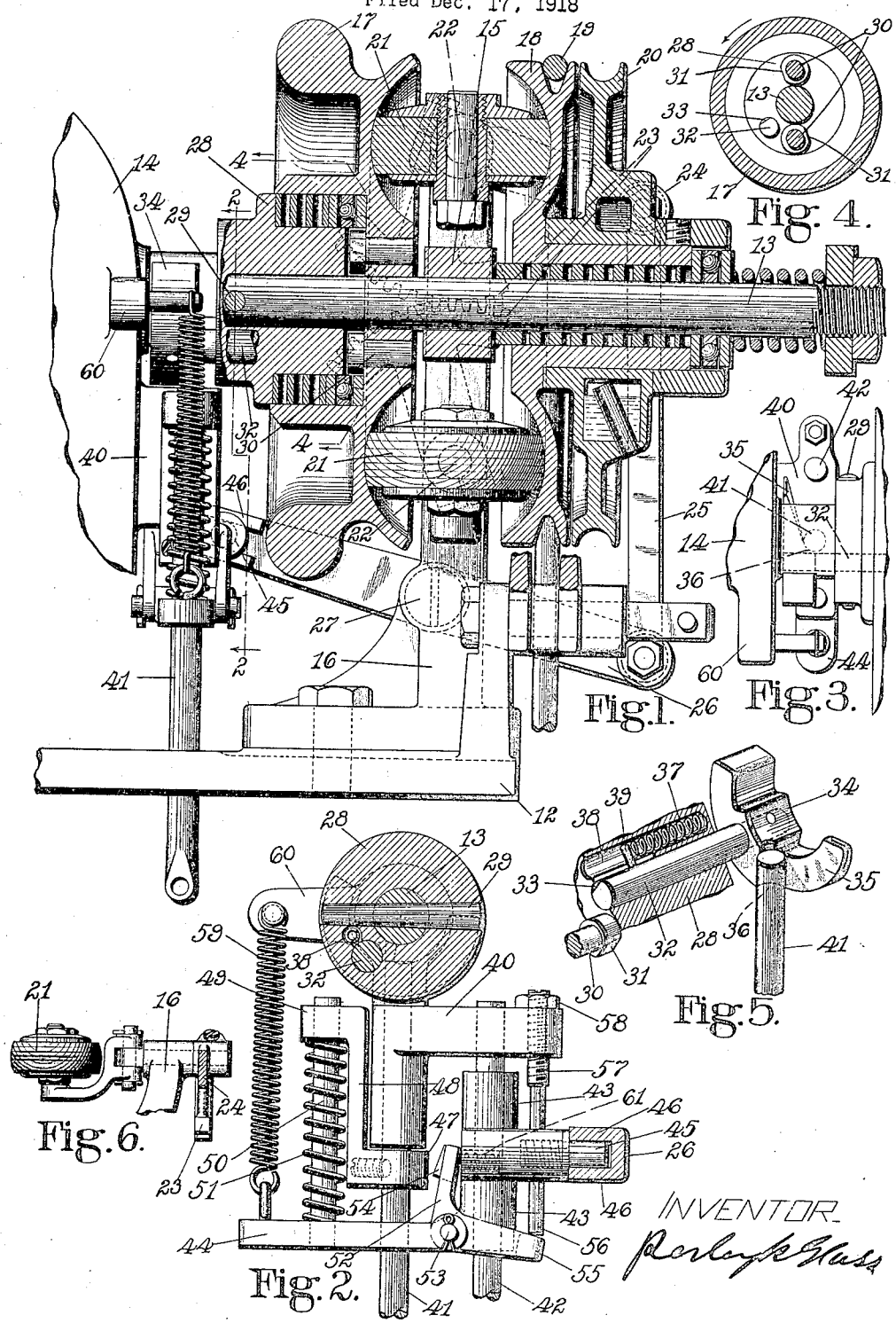

1,465,391

UNITED STATES PATENT OFFICE.

PERLEY R. GLASS, OF BROOKLINE, MASSACHUSETTS, ASSIGNOR TO UNITED SHOE MACHINERY CORPORATION, OF PATERSON, NEW JERSEY, A CORPORATION OF NEW JERSEY.

MECHANISM FOR CONTROLLING POWER-DRIVEN MACHINES.

Application filed December 17, 1918. Serial No. 267,182.

*To all whom it may concern:*

Be it known that I, PERLEY R. GLASS, a citizen of the United States, residing at Brookline, in the county of Norfolk and State of Massachusetts, have invented certain Improvements in Mechanisms for Controlling Power-Driven Machines, of which the following description, in connection with the accompanying drawings, is a specification, like reference characters on the drawings indicating like parts in the several figures.

This invention relates to mechanisms for controlling the operation of power driven machines.

Many machines, such as perforating machines or eyeleting machines, are designed to be run at a maximum effective speed for a substantial period of time depending upon the character of the work to be performed, the stopping of such a machine being effected at the will of the operator. In the use of many such machines the conditions under which they are operated and the character of the work to be performed are frequently such that, so far as these considerations are concerned, the machines may properly be run at speeds so high that suddenly stopping the machines at these speeds would be likely to cause substantial damage.

An important object of this invention is to provide mechanism for controlling the operation of any machine, which mechanism will permit the machine to be driven at high speeds, including speeds higher than any speed at which the machine can be safely stopped without danger of damage, and which will at the same time insure against stopping the machine at such a speed, thus permitting the use even of one-revolution clutches, such as characteristically effect particularly sudden stoppage of the machine.

The present invention provides for the combination of a variable speed driving mechanism, parts of which may be positioned to control the speed at which the machine is driven according to the character of that portion of the work being operated upon at any particular moment, with a stopping mechanism which is inoperative when the parts of the variable speed driving mechanism are positioned to drive the machine at a speed in excess of a predetermined minimum. Said parts may be conveniently positioned at the will of the operator or otherwise, in accordance with the varying speed requirements. As the speed at which it is convenient to obtain power for driving the mechanism is different in different locations, provision is made, in the illustrated construction, for adjusting that position of the speed varying mechanism which will render the stopping mechanism operative or inoperative, in order that the stopping mechanism will not be required to operate when the resulting speed is high enough to injure the parts upon sudden stopping. This adjustment is also convenient because it is often desirable, on account of the class of work being done, to have the minimum speed of a machine less than the safe maximum at which the stopping mechanism can be operated.

The novel construction and arrangement of parts of the mechanism by which the above-mentioned results are attained constitute other features of the invention which will be more particularly described hereinafter and pointed out in the claims.

The accompanying drawings forming a part of this specification illustrate a preferred embodiment of the invention.

In the drawings,

Figure 1 is a sectional elevation of a preferred embodiment of the invention;

Fig. 2 represents a section on line 2—2 of Fig. 1;

Fig. 3 is a detail plan view of the parts especially illustrated in Fig. 2;

Fig. 4 represents a section on line 4—4 of Fig. 1, on a slightly reduced scale;

Fig. 5 is a fragmentary perspective of the stop and a part of the clutch mechanism and Fig. 6 is a detail sectional view, on a smaller scale, of one of the shiftable friction wheels and its mounting.

A portion of the base of the mechanism is indicated at 12. The shaft 13 to be driven is mounted in suitable bearings provided in the frame of the machine which is to be driven, a portion of such frame being indicated at 14, the shaft also passing through a bearing 15 supported by an upright 16 mounted on the base.

A wheel 17 and a pulley 18, which may be considered as disks, are mounted loosely on the shaft, it being unnecessary to explain in detail the particular mounting of said wheel and pulley. The pulley 18 is adapted to be driven by a belt 19 and alongside of said pulley is an idle pulley 20. The sides of the wheels 17 and 18 which face each other are annularly concaved and between said concaved faces two shiftable friction wheels 21 are mounted, the axes of adjustment of said friction wheels being indicated by dotted lines at 22 in Fig. 1. Each of said friction wheels, as illustrated in Fig. 6, is jointed to an oscillating stud shaft mounted in a suitable bearing in the upright 16, and each of the oscillating stud shafts is provided with a toothed segment arm 23. The two toothed segments intermesh, as indicated by dotted lines in Fig. 1, and the upper oscillating shaft has an arm 24 (Fig. 6 and dotted lines Fig. 1). The mechanism including the two wheels or disks having annularly concaved faces with intermediate shiftable friction wheels is a well-known speed changing friction gear which, as far as my present invention is concerned, may be replaced by any other suitable speed changing gear. I have illustrated the particular form referred to because it is a convenient one for my present purposes.

The arm 24 is connected by a link 25 to the outer end of a lever 26 pivoted at 27 to the upright 16. The purpose of this lever will be presently explained.

Rigidly secured to the shaft 13 is a hub 28, the connection in the present instance being effected by means of a pin 29 passing through the hub and shaft. Opposite the inner end of the hub 28 are two clutch studs 30 carried by the hub portion of wheel 17, the sides of the heads of the studs 30 being flattened as at 31 (Fig. 4). A rod 32 which forms the clutch pin is mounted in the hub 28 at one side of and parallel with the axis of the latter, said pin or rod being longitudinally shiftable. It has a flat face 33. Rigidly secured to the outer end of the rod or pin 32 is a curved dog 34, the middle portion of which is adapted to fit a guideway formed in an enlarged portion of the shaft or to a sleeve secured to the shaft. The details of this feature are not necessary to illustrate fully herein as this portion of the mechanism is similar to that illustrated and described in Letters Patent No. 1,261,506, granted April 2, 1918 to A. F. Forbes (see Fig. 6 of said patent).

The dog 34 has a beveled tip 35 and a shoulder 36 for the same purpose as in said patent, a spring 37 mounted in a socket 38 being confined between the bottom of said socket and a pin 39 projecting from rod 32, said spring normally tending to slide the clutch dog 34 toward the adjacent face of the hub 28 and cause the end of clutch pin 32 to project between the heads of the studs 30 in the hub of wheel 17.

A bracket 40 attached to or integral with frame 14 (Figs. 1 and 2) is bored to form a guide for a vertical pin 41 adapted to be operated by a suitable treadle (not shown) the upper end of the rod coacting with the shoulder 36 of the dog 34 (Fig. 5) to stop rotation of the shaft in the same manner as the similar device shown in the Forbes patent referred to.

As so far described, the mechanism is not materially different from well-known structures, but to aid an understanding of my improvement yet to be described I will briefly explain the operation of the parts that have been referred to.

Assuming that the speed of rotation of the disk or pulley 18 is constant, anything which rocks the friction wheels 21 on their axes of adjustment will vary the speed of rotation transmitted to the disk or wheel 17 and so long as said disk or wheel is coupled or clutched to the shaft 13, the speed of rotation of that shaft will also be varied. In the present structure this change of speed is effected by means of the lever 26 which acts through the link 25 to rock or oscillate the friction wheels 21 in a manner well-known in this type of variable drive friction gear. So long as the clutch pin 32 is in position so that its operative end is interposed between the two clutch studs 30, the speed of rotation caused by the wheel 17 will be transmitted to the shaft. When the clutch pin 32 is retracted, or is in the position indicated in Fig. 5, there can be no co-action between the pin 32 and the studs 30 and the shaft 13 is therefore disconnected or unclutched. When the rod 41 is in the position shown in Fig. 5 its upper end co-acts with the shoulder 36 of the dog 34 to positively stop rotation of the shaft.

I will now describe the illustrated embodiment of my invention which renders it impossible to cause or effect a stoppage of the shaft except when the lever 26 is in such position as to hold the friction wheels 21 in positions to drive the wheel 17 at a predetermined minimum speed.

A fixed rod 42 (see Fig. 2) having its upper end mounted in the fixed bracket 40 and having its lower end secured in any suitable manner, constitutes a guide for a slide 43, said slide having an arm 44. A mid portion of the slide 43 is formed or provided with a lateral extension carrying a pin or roll 45 entering the space between the ribs 46 of lever 26. Consequently the vertical position of the slide 43 controls the position of the lever 26 and the speed of rotation imparted to shaft 13.

Secured to the vertically movable rod 41 is a hub 47 having an arm 48 the head or upper end of which fits over a pin 50 rising from the arm 44 of the slide 43. A spring 51 coiled about the pin 50 is confined between the head 49 and arm 44. An elbow lever 52 is pivotally connected at 53 to one side of the slide 43, one arm of said elbow lever being provided with a hook or catch 54 adapted, as presently explained, to engage the upper edge of the hub 47. The other arm 55 of the elbow lever projects below the lower end of a pin 56 having a screw threaded portion 57 engaging a threaded opening in the fixed bracket 40, a nut 58 serving to secure an adjustment of the pin 56 after such adjustment has once been made. A spring 59 connects the end of arm 44 of the slide with an arm 60 of the frame 14, said spring being heavier or stronger than the spring 51 for a reason presently explained.

A spring 61 (see dotted lines Fig. 2) mounted in a socket in slide 43 is in engagement with the elbow lever 52 and operates it to engage the upper edge of the hub 47 and thus lock the slide 43 and rod 41 together, as will be explained below. In operation, assuming that the shaft has been stopped owing to the rod 41 being in the position shown in Fig. 5, but of course with the driving pulley 18 acting through the shiftable friction wheels 21 to drive the wheel or disk 17, the operator then by actuating a treadle or other means to shift the rod 41 down below the path of rotation of the dog, imparts such downward movement of the rod 41 as to release the stop and permit the clutch pin 32 to slide so that the shaft and wheel 17 will be connected and the shaft will be driven at the rate of speed which has been predetermined for the wheel 17. During this first downward movement of the rod 41 no change of speed can occur because, although the hub 47 and its arm 48 move with the rod 41, there is no downward movement of the slide 43 which connects with the speed changing lever 26 simply because the spring 59 is sufficiently stronger than the spring 51 to hold the slide against downward movement until the hub 47 engages the arm 44 of the slide. When this engagement takes place, the rod 41 has been lowered far enough to bring the upper edge of the hub 47 just below hook 54. Further movement then lowers the slide 43, and the spring 61 causes the hook 54 to move into engagement with the hub 47, the arm 55 of the elbow lever swings about its pivot 53 and finally leaves the end of the pin 56. This renders it certain that when the rod 41 moves upwardly again the slide 43 will be locked with it, and be positively carried up far enough to act through lever 26 to bring the speed of shaft 13 back to predetermined minimum before the upper end of rod 41 reaches position to act on the cam 35 of the dog.

After the lower end of the hub 47 contacts with the arm 44 of the slide 43 on its downward movement, the downward movement of the rod 41 may be continued to enable the operator to run the machine at a very high speed for such length of time as he may desire, with no possibility of the shaft being stopped until the driving speed has been reduced to the desired minimum as described. When it is desired to return from excessive speed to normal, pressure on the treadle is relieved so as to permit the rod 41 to rise, under the influence of the upward pull of the spring 59. After the rod 41 rises far enough to bring the arm 55 of the elbow lever into contact with the adjusting pin 56, further movement causes the catch 54 to be automatically released from hub 47 and when the rod 41 and the slide 43 rise a little farther, as described below, the machine will be driven at minimum speed and no further upward movement of the slide 43 can occur. If the machine is to be stopped, the rod 41 is permitted to rise still further, under the influence of the spring 51, until its upper end acts on the clutch dog (Fig. 5) to effect separation of the clutch members and stoppage of the shaft.

The operation of the rod 41 and of the slide 43 will now be explained in greater detail. During the first portion of downward movement of rod 41 spring 51 yields but spring 59 does not yield and no movement is imparted to slide 43 (and consequently no change of speed of shaft 13 occurs) until hub 47 reaches arm 44 after which, if the rod 41 continues down, spring 59 yields, the slide 43 moves down and acts through lever 26 to gradually increase the speed at which the shaft is driven. The catch 54 has now engaged hub 47 so that on the return upward movement of rod 41 the slide is forced to rise and reduce speed (but still drive the shaft) until arm 55 contacts with the end of pin 56 and the elbow lever is swung on its pivot and the catch 54 is disengaged from hub 47. Since the spring 59 continues to exert a lifting action on slide 43, said slide is only stopped when, with one arm of the elbow lever still in contact, contact with pin 56 (due to the pressure of spring 61) the other arm is arrested by the side of the slide as shown in Fig. 2. If the pin 56 is adjusted lower or higher the disengagement of the catch 54 and the stoppage of upward movement of the slide will occur earlier or later in the period of upward movement of the rod 41 and consequently said pin provides means for varying the point beyond which, during movement of rod 41 toward its unclutching and stopping operation, no reduction in driving speed can occur. In other words, by means of the adjustable pin 56 the operator can easily and quickly vary the minimum speed at which the machine will run and to which the speed must be reduced before the stopping mechanism can be operated.

Having described the invention, what I claim as new is:—

1. Mechanism for controlling the operation of a shaft comprising a clutch, a stop for the shaft, devices which may be positioned in accordance with the varying speed requirements of a machine driven by the shaft to control the speed at which the shaft is driven by the clutch, and means for preventing operation of the stop when said devices are positioned to give to the shaft any speed exceeding a predetermined rate.

2. Mechanism for controlling the operation of a shaft comprising a clutch, means for positively stopping the shaft, devices which may be positioned in accordance with the varying speed requirements of a machine driven by the shaft to control the speed at which the shaft is driven by the clutch, and means for preventing operation of the stopping means when said devices are positioned to give to the shaft any speed exceeding a predetermined rate.

3. Mechanism for controlling the operation of a shaft comprising a clutch, a stop for the shaft, devices which may be positioned in accordance with the varying speed requirements of a machine driven by the shaft to control the speed at which the shaft is driven by the clutch, and means for permitting operation of the stop only when said devices are positioned to give to the shaft a predetermined minimum speed.

4. Mechanism for controlling the operation of a shaft, comprising a variable speed driver for the shaft, means for disconnecting the shaft from the driver and stopping it, and means for preventing the operation of the shaft disconnecting means during rotation of the shaft at a speed exceeding a predetermined rate.

5. Mechanism for controlling the operation of a shaft comprising a clutch, a stop for the shaft, devices which may be positioned in accordance with the varying speed requirements of a machine driven by the shaft to control the speed at which the shaft is driven by the clutch, means for permitting and preventing the operation of the stop, said means being controlled by the position of said devices and means for varying the position at which said devices permit the operation of said stop.

6. Mechanism for controlling the operation of a shaft comprising a clutch, a stop for the shaft, devices which may be positioned at the will of the operator to control the speed at which the shaft is driven by the clutch, means for permitting and preventing the operation of the stop, said means being controlled by the position of said devices and means for varying the position at which said devices prevent the operation of said stop.

7. Mechanism for controlling the operation of a shaft comprising a clutch, a stop for the shaft, devices which may be positioned at the will of the operator to control the speed at which the shaft is driven by the clutch, means for permitting and preventing the operation of the stop, said means being controlled by the position of said devices and means for varying the position at which said devices permit and prevent the operation of said stop.

8. Mechanism for controlling the operation of a shaft comprising a clutch member fixed on the shaft, a clutch member loose upon the shaft, means for engaging and disengaging the two clutch members, devices which may be positioned at the will of the operator to control the speed at which the loose clutch member is driven, and means for ensuring that said devices are positioned to give a predetermined minimum speed to the loose clutch member before said clutch members may be disengaged.

9. Mechanism for controlling the operation of a shaft comprising a clutch member fixed on the shaft, a clutch member loose upon the shaft, means for engaging and disengaging the two clutch members, devices which may be positioned at the will of the operator to control the speed at which the loose clutch member is driven, and means for ensuring that said devices are positioned to give a predetermined minimum speed to the loose clutch member when the clutch members are brought into engagement.

10. Mechanism for controlling the operation of a shaft comprising a clutch member fixed on the shaft, a clutch member loose upon the shaft, means for engaging and disengaging the two clutch members, devices which may be positioned at the will of the operator to control the speed at which the loose member is driven, and means for ensuring that said devices are positioned to give a predetermined minimum speed to the loose clutch member when the clutch members are brought into engagement and to prevent disengagement until said devices are returned to said position.

11. Mechanism for controlling the operation of a shaft comprising a stop for the shaft, a clutch member fixed on the shaft, a clutch member loose upon the shaft, means for engaging and disengaging the two clutch members, devices which may be positioned in accordance with the varying speed requirements of a machine driven by the shaft to control the speed at which the loose clutch member is driven, means for ensuring that said devices are positioned to give a predetermined minimum speed to the loose clutch member before said clutch members may be disengaged and the stop permitted to operate, and means for adjusting said devices to give the desired minimum of speed.

12. Mechanism for controlling the operation of a shaft, comprising a variable speed driver having a clutch connection with the shaft, a slide and connections whereby the position of said slide controls the speed, a stop movable in the same direction as the slide, and means for automatically connecting and disconnecting the stop and slide at a point to prevent operation of the stop during rotation of the shaft at a speed exceeding a predetermined rate.

13. A device of the character described having, in combination, a shaft, a variable speed driver having a clutch connection with the shaft, a stop for the shaft, a longitudinally movable rod for controlling the clutch and stop, a catch member adapted to be coupled to and disconnected from said rod whereby said catch member will be moved by the rod during a portion of the movement of the latter, and connections whereby the movements of the catch member will control the speed of the shaft.

14. Mechanism for controlling the operation of a shaft comprising a shaft, a loose driving pulley, a loose clutch member, pivotally mounted friction devices to connect the loose driving pulley with the loose clutch member and drive the latter at any speed between a minimum and maximum, connections to position the friction devices at the will of the operator, a clutch member fixed to the shaft, a movable pin for connecting and disconnecting the two clutch members, a positive stop for the fixed clutch member, operator controlled means for controlling said pin and stop to start and stop the shaft, interlocking devices between the pin controlling means and the connections to the friction devices to prevent starting or stopping of the shaft except when the friction devices are positioned to drive the loose clutch member at the minimum speed and means to predetermine said minimum speed.

15. Mechanism for controlling the operation of a shaft comprising a clutch, means for positively stopping the shaft, devices which may be positioned to drive the shaft at any speed between a minimum and a maximum, means for adjusting said minimum speed, and means for preventing operation of the stopping means when said devices are positioned to give to the shaft any speed except said minimum.

In testimony whereof I have signed my name to this specification.

PERLEY R. GLASS.